(12) United States Patent
Salsbury et al.

(10) Patent No.: US 11,199,336 B2
(45) Date of Patent: Dec. 14, 2021

(54) HVAC SYSTEM WITH ON-OFF CONTROL

(71) Applicant: Johnson Controls Technology Company, Auburn Hills, MI (US)

(72) Inventors: Timothy I. Salsbury, Whitefish Bay, WI (US); John M. House, Saint-Leonard (CA); Carlos Felipe Alcala Perez, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 102 days.

(21) Appl. No.: 16/523,913

(22) Filed: Jul. 26, 2019

(65) Prior Publication Data

US 2021/0025608 A1  Jan. 28, 2021

(51) Int. Cl.
| | |
|---|---|
| *F24F 11/30* | (2018.01) |
| *G05B 13/04* | (2006.01) |
| *F24F 11/66* | (2018.01) |
| *F24F 11/67* | (2018.01) |
| *F24F 11/64* | (2018.01) |
| *F24F 140/00* | (2018.01) |

(52) U.S. Cl.
CPC ............. *F24F 11/30* (2018.01); *F24F 11/64* (2018.01); *F24F 11/66* (2018.01); *F24F 11/67* (2018.01); *G05B 13/048* (2013.01); *F24F 2140/00* (2018.01)

(58) Field of Classification Search
CPC .. F24F 11/30; F24F 11/64; F24F 11/67; F24F 11/66; F24F 2140/00; G05B 13/048

USPC .......................................................... 700/276
See application file for complete search history.

(56) References Cited

U.S. PATENT DOCUMENTS

| | | |
|---|---|---|
| 6,219,590 B1 | 4/2001 | Bernaden, III et al. |
| 6,296,193 B1 | 10/2001 | West et al. |
| 6,369,716 B1 | 4/2002 | Abbas et al. |
| 6,408,228 B1 | 6/2002 | Seem et al. |
| 6,540,148 B1 | 4/2003 | Salsbury et al. |
| 6,594,554 B1 | 7/2003 | Seem et al. |
| 6,647,318 B2 | 11/2003 | Salsbury |
| 6,862,540 B1 | 3/2005 | Welch et al. |
| 7,024,254 B2 | 4/2006 | Salsbury et al. |
| 7,505,877 B2 | 3/2009 | Salsbury |
| 7,729,882 B2 | 6/2010 | Seem |
| 8,200,344 B2 | 6/2012 | Li et al. |
| 8,255,085 B2 | 8/2012 | Salsbury |
| 8,473,080 B2 | 6/2013 | Seem et al. |
| 8,495,888 B2 | 7/2013 | Seem |
| 8,567,204 B2 | 10/2013 | Seem |
| 8,694,132 B2 | 4/2014 | Li et al. |
| 8,781,608 B2 | 7/2014 | Seem et al. |
| 9,739,496 B2 | 8/2017 | Seem et al. |

(Continued)

*Primary Examiner* — Jigneshkumar C Patel
(74) *Attorney, Agent, or Firm* — Foley & Lardner LLP

(57) ABSTRACT

A controller for HVAC equipment of a plant includes a processing circuit configured to predict an impact of a time delay of the plant on a performance variable received as feedback from the plant. The processing circuit is configured to artificially increase or decrease a value of the performance variable using an adjustable time delay parameter to at least partially negate the impact of the time delay on the performance variable. The processing circuit is configured to use the artificially increased or decreased value of the performance variable in on-off feedback control to operate the HVAC equipment.

16 Claims, 10 Drawing Sheets

(56) References Cited

U.S. PATENT DOCUMENTS

| | | | |
|---|---|---|---|
| 10,253,997 B2 | 4/2019 | Salsbury et al. | |
| 10,333,810 B2 | 6/2019 | Alcala Perez et al. | |
| 2003/0153986 A1 | 8/2003 | Salsbury et al. | |
| 2007/0262741 A1 | 11/2007 | Singhal et al. | |
| 2008/0277486 A1 | 11/2008 | Seem et al. | |
| 2008/0281439 A1 | 11/2008 | Salsbury | |
| 2009/0216380 A1* | 8/2009 | Kolk | F24F 11/30 700/277 |
| 2012/0117995 A1* | 5/2012 | Moore | F25B 49/022 62/157 |
| 2012/0170639 A1* | 7/2012 | Salsbury | G05B 13/048 375/233 |
| 2015/0316907 A1 | 11/2015 | Elbsat et al. | |
| 2016/0132027 A1 | 5/2016 | Li et al. | |
| 2016/0370258 A1 | 12/2016 | Perez | |
| 2017/0329357 A1* | 11/2017 | Torres | G05B 15/02 |
| 2017/0366414 A1 | 12/2017 | Hamilton et al. | |
| 2018/0087790 A1 | 3/2018 | Perez | |
| 2018/0088547 A1 | 3/2018 | Perez | |
| 2018/0252422 A1 | 9/2018 | Salsbury et al. | |
| 2018/0267515 A1 | 9/2018 | House et al. | |
| 2018/0284701 A1 | 10/2018 | Salsbury et al. | |
| 2018/0299839 A1 | 10/2018 | Salsbury et al. | |
| 2018/0356111 A1 | 12/2018 | Salsbury et al. | |

\* cited by examiner

HVAC SYSTEM WITH ON-OFF CONTROL

BACKGROUND

The present disclosure relates generally to control systems for an HVAC system. More particularly, the present disclosure relates to a control system configured to reduce temperature swings in heating, ventilation, air conditioning (HVAC) control systems.

Many control algorithms for HVAC systems are based on operator established set points and permissible variation about the set points. The range of temperatures between the lowest permissible temperature and the highest permissible temperature is generally referred to as a "deadband." The control algorithm may actuate a cooling system in response to sensing a temperature higher than the highest permissible temperature. The control algorithm may actuate a heating system in response to sensing a temperature lower than the lowest permissible temperature. Many HVAC systems have minimum on/off times to reduce cycling of the HVAC equipment and wear on the HVAC equipment.

SUMMARY

One implementation of the present disclosure is a controller for HVAC equipment of a plant, according to some embodiments. In some embodiments, the controller includes a processing circuit configured to predict an impact of a time delay of the plant on a performance variable received as feedback from the plant. In some embodiments, the processing circuit is configured to artificially increase or decrease a value of the performance variable using an adjustable time delay parameter to at least partially negate the impact of the time delay on the performance variable. In some embodiments, the processing circuit is configured to use the artificially increased or decreased value of the performance variable in on-off feedback control to operate the HVAC equipment.

In some embodiments, the adjustable time delay parameter is an amount of time that elapses between a first time at which the HVAC equipment transitions between an on-state and an off-state and a second time at which the performance variable begins to change as a result of the transition.

In some embodiments, the adjustable time delay parameter is an amount of time that elapses between a first time at which the HVAC equipment transitions between an on-state and an off-state and a second time at which the performance variable changes by an amount exceeding a threshold as a result of the transition.

In some embodiments, the on-off feedback control includes deadband control. In some embodiments, the controller is configured to transition the HVAC equipment or a stage of the HVAC equipment between an on-state and an off-state based on a setpoint value and a deadband value.

In some embodiments, the controller is configured to artificially increase or decrease the value of the performance variable using a filter based on an exponential expansion of a transfer function that at least partially negates the impact of the time delay on the performance variable.

In some embodiments, the controller is configured to artificially increase or decrease the value of the performance variable using multiple filters in series that at least partially negate the impact of the time delay of the plant on the performance variable.

In some embodiments, the controller is configured to obtain the adjustable time delay parameter based on samples of the performance variable received over a time period.

In some embodiments, the controller is configured to obtain the adjustable time delay parameter by perturbing an input to the plant and observing a dynamic response of the plant to the perturbed input.

In some embodiments, the controller is configured to increase or decrease the adjustable time delay parameter in response to the time delay of the plant changing.

In some embodiments, the controller is configured to obtain the adjustable time delay parameter based on at least one of a type of the HVAC equipment, one or more parameters of a space of the plant, or one or more parameters of the plant.

Another implementation of the present disclosure is a method for performing on-off control for a plant, according to some embodiments. In some embodiments, the method includes predicting an impact of a time delay of the plant on a performance variable received as feedback from the plant. In some embodiments, the method includes artificially increasing or decreasing a value of the performance variable using an adjustable time delay parameter to at least partially negate the impact of the time delay on the performance variable. In some embodiments, the method includes using the artificially increased or decreased value of the performance variable in on-off feedback control to operate the HVAC equipment.

In some embodiments, the adjustable time delay parameter is an amount of time that elapses between a first time at which the HVAC equipment transitions between an on-state and an off-state and a second time at which the performance variable begins to change as a result of the transition.

In some embodiments, the adjustable time delay parameter is an amount of time that elapses between a first time at which the HVAC equipment transitions between an on-state and an off-state and a second time at which the performance variable changes by an amount exceeding a threshold as a result of the transition.

In some embodiments, the method further includes increasing or decreasing the adjustable time delay parameter in response to a change in the time delay of the plant.

In some embodiments, the performance variable is artificially increased or decreased using one or more filters and one or more samples of the performance variable. In some embodiments, each of the filters correspond to a portion of an exponential expansion of a transfer function that at least partially negates the impact of the time delay.

In some embodiments, the method further includes selecting the adjustable time delay parameter based on at least one of a type of the HVAC equipment, one or more parameters of a space of the plant, or one or more parameters of the plant.

In some embodiments, the method further includes perturbing an input to the plant, observing a dynamic response of the plant to the perturbed input, and obtaining the adjustable time delay parameter based on the dynamic response of the plant.

Another implementation of the present disclosure is a system for controlling a plant, according to some embodiments. In some embodiments, the system includes HVAC equipment that operates to affect a performance variable of a plant and a controller including a processing circuit. In some embodiments, the processing circuit is configured to predict an impact of a time delay of the plant on the performance variable received as feedback from the plant. In some embodiments, the processing circuit is configured to artificially adjust a value of the performance variable using an adjustable time delay parameter to at least partially negate the impact of the time delay on the performance variable. In some embodiments, the processing circuit is configured to use the artificially adjusted value of the performance variable in on-off feedback control to operate the HVAC equipment.

In some embodiments, the controller is configured to increase or decrease the adjustable time delay parameter to account for a change in the time delay of the plant.

In some embodiments, the controller is configured to artificially increase or decrease the value of the performance variable using a filter based on an exponential expansion of a transfer function that at least partially negates the impact of the time delay on the performance variable.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, systems and methods for improving the operation of deadband or on-off control systems are described. Advantageously, the systems and methods described herein can be used to reduce over and undershoot of the on-off control system. These systems and methods provide a simple solution for addressing the problem of excessive swings in temperature of thermostat control loops. The systems and methods may require an approximate estimate of a time delay of a plant that the on-off control system serves. The time delay can be estimated separately from the on-off control system, or can be estimated automatically.

An on-off control system can include a feedback controller (i.e., a deadband controller). The deadband controller is configured to transition equipment between various predetermined modes of operation. The deadband controller can also transition the equipment between various states (e.g., an on-state and an off-state) for the predetermined modes of operation. The equipment operates to affect a variable state or environmental condition of a plant. The deadband controller may receive feedback from the plant and use the feedback to determine control signals for the equipment.

A filter is used to filter the feedback received from the plant. The filter can be implemented as a single first order filter, or multiple first order filters in series. The filter can be used to account for the time delay of the plant, thereby improving the on-off control system. Advantageously, the filter can be applied separately from the control logic of the deadband controller. This allows the filter to be easily implemented in multi stage systems without adding any additional complexity or requiring different control logic for the deadband controller.

Building and HVAC System

Figure 1:
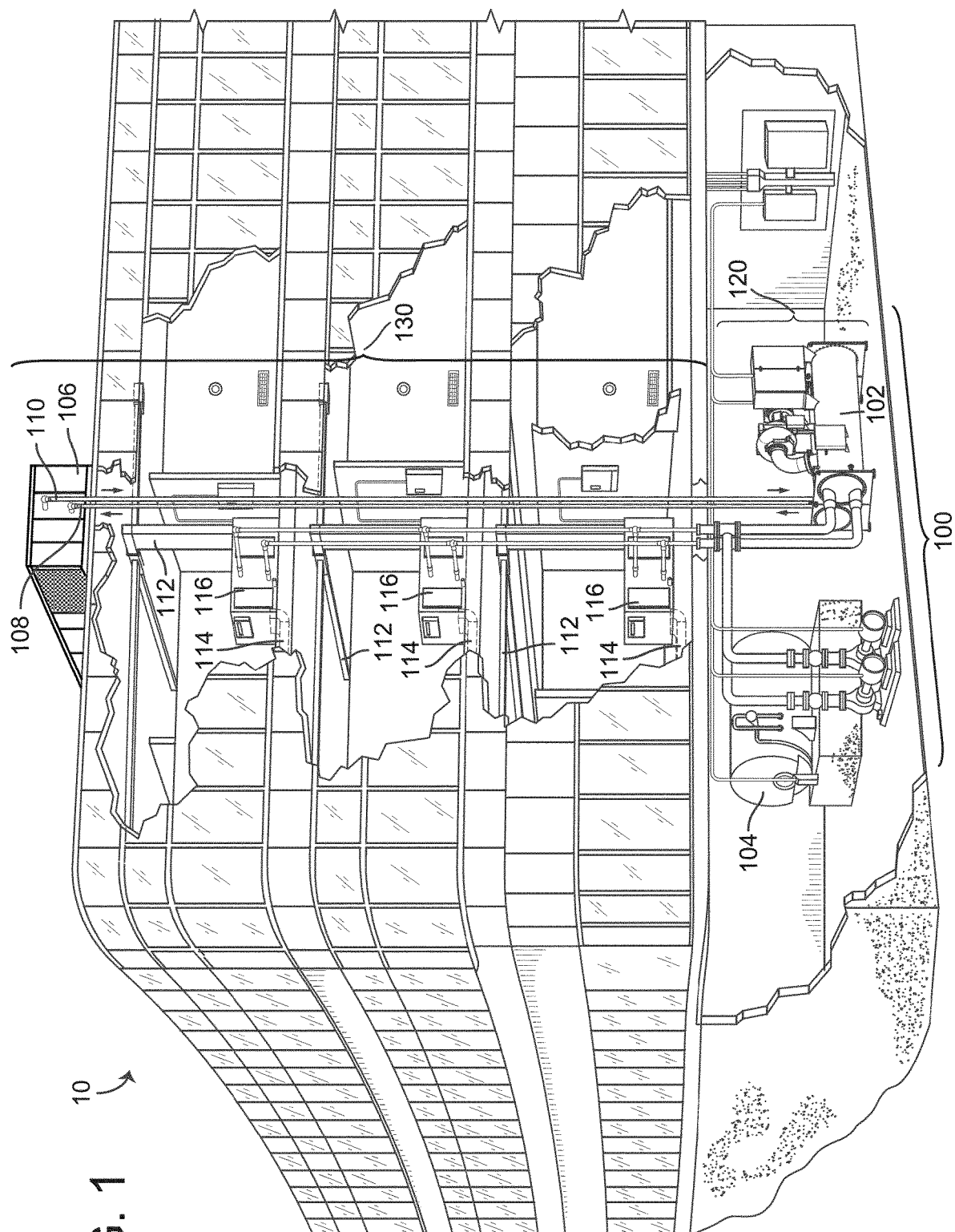
FIG. 1 is a drawing of a building equipped with a HVAC system, according to an exemplary embodiment.

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
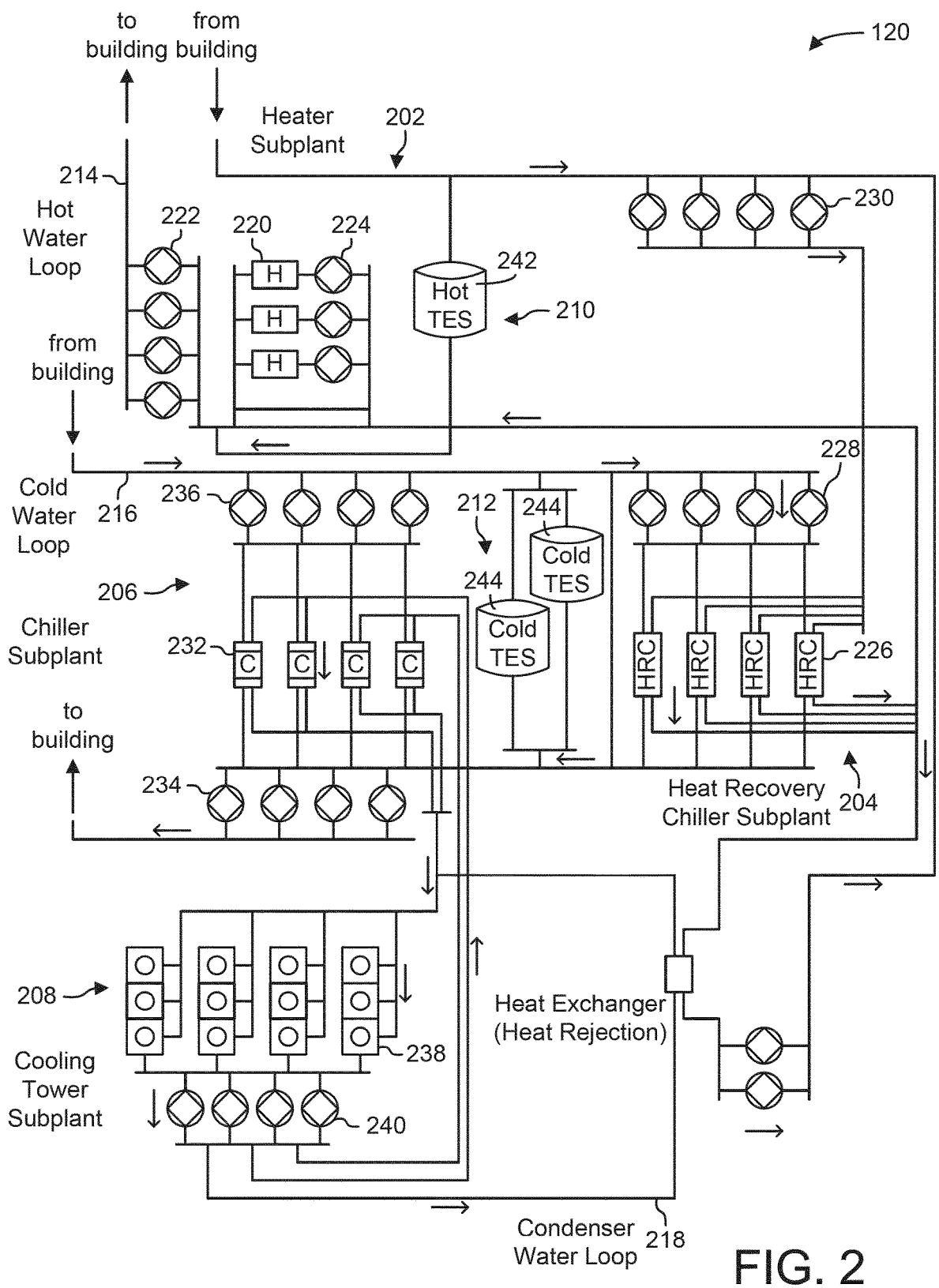
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
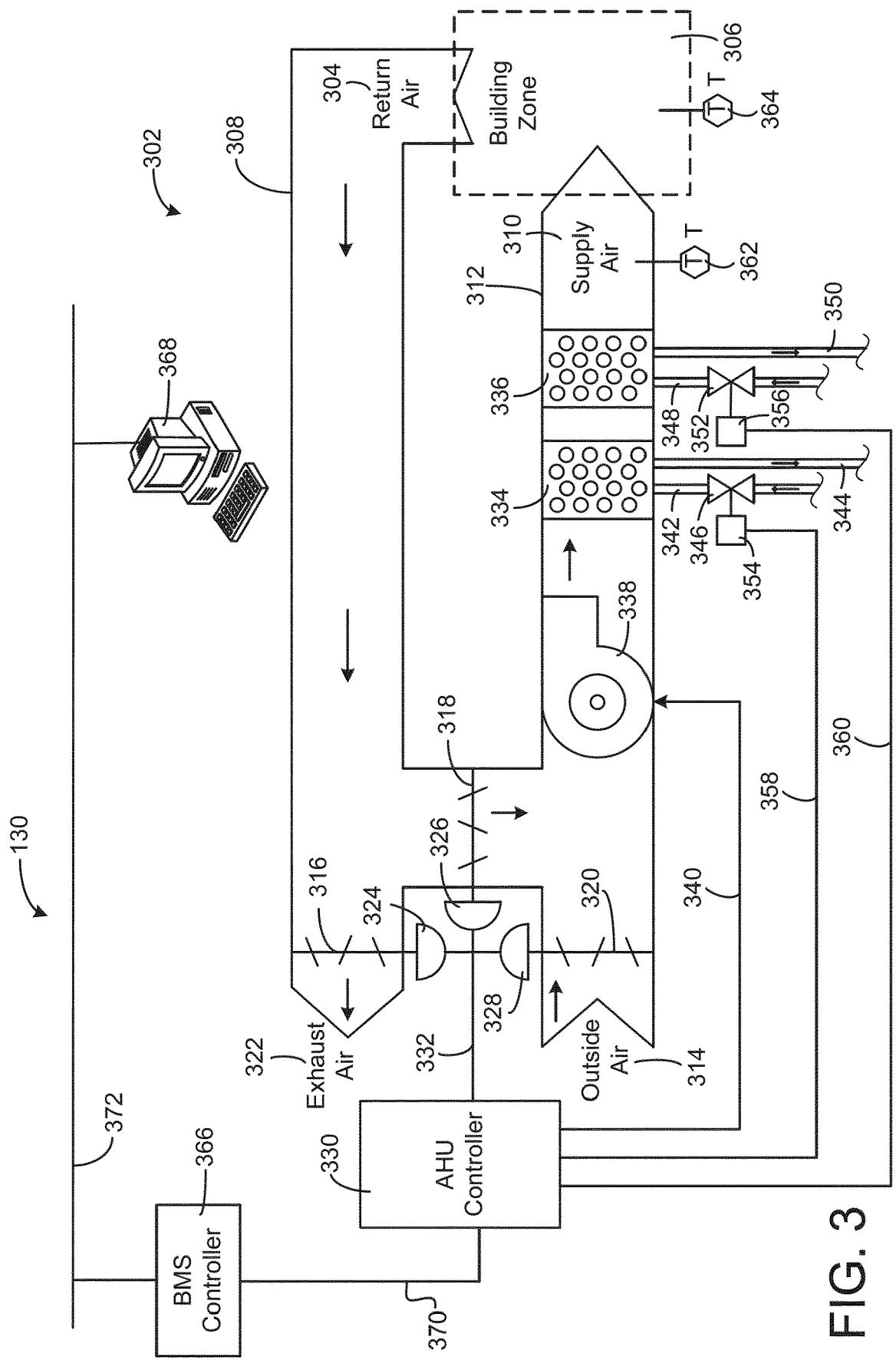
FIG. 3 is a block diagram of an airside system which can be implemented in the building of FIG. 1, according to an exemplary embodiment.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200(e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off-states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

HVAC System

Figure 4A:
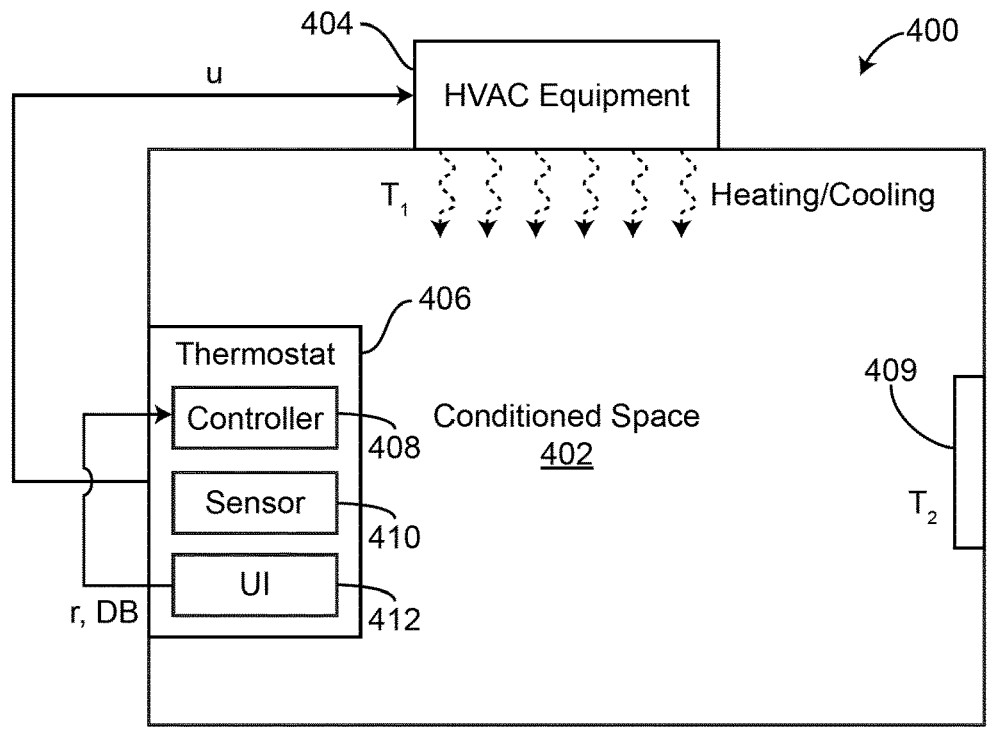
FIG. 4A is a block diagram of an on-site thermostat configured to adjust an operation of HVAC equipment for a conditioned space, according to some embodiments.
Figure 4B:
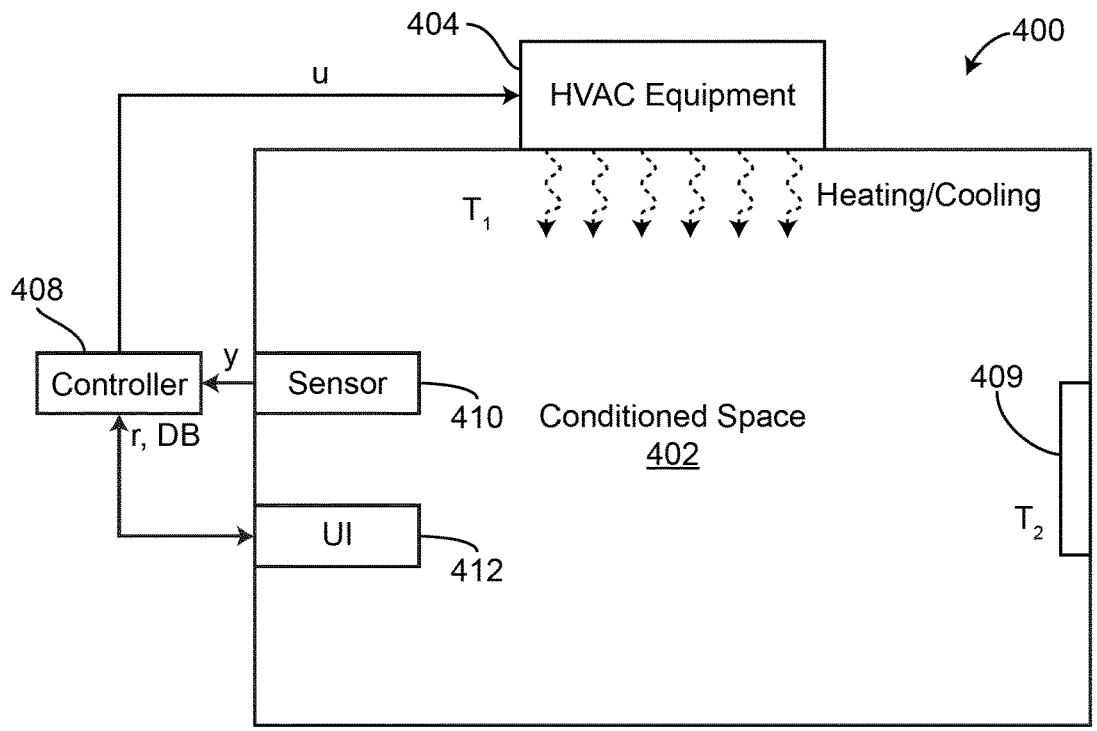
FIG. 4B is a block diagram of a controller configured to adjust an operation of HVAC equipment for a conditioned space, according to some embodiments.

Referring now to FIGS. 4A-4B, system 400 is shown, according to some embodiments. System 400 includes conditioned space 402, according to some embodiments. Conditioned space 402 may be a room, an area, a floor of a building, etc., or any other space to which heating and/or cooling is provided and monitored. System 400 includes HVAC equipment 404 configured to provide heating or cooling to conditioned space 402, according to some embodiments. HVAC equipment 404 may be configured to provide heating and/or cooling to conditioned space 402 via one or more ducts, vents, fans, etc. Conditioned space 402 may have a temperature distribution throughout various areas of conditioned space 402. For example, conditioned space 402 may have a temperature $T_1$ near HVAC equipment 404, and a temperature $T_2$ near a window or door 409. If HVAC equipment 404 is in an operating state to provide cooling to conditioned space 402, $T_2$ may be greater than $T_1$. Likewise, if HVAC equipment 404 is in an operating state to provide heating to conditioned space 402, $T_2$ may be less than $T_1$. Conditioned space 402 may have an average temperature (e.g., an average with respect to area of conditioned space 402) $T_{avg}$.

System 400 includes thermostat 406 as shown in FIG. 4A, according to some embodiments. Thermostat 406 is configured to adjust an operation of HVAC equipment 404 by providing HVAC equipment 404 with manipulated variable u, according to some embodiments. In some embodiments, manipulated variable u is a command to transition HVAC equipment 404 between an on-state and an off-state. In some embodiments, manipulated variable u is a command to transition HVAC equipment 404 between a cooling state, a heating state, and an off-state. For example, if HVAC equipment 404 includes equipment configured to provide heating to conditioned space 402, thermostat 406 may provide the heating equipment of HVAC equipment 404 configured to provide heating to conditioned space 402 with manipulated variable $u_H$ which indicates a command to transition the heating equipment of HVAC equipment 404 between an on-state (i.e., a state which causes the heating equipment to operate to provide heating to conditioned space 402) and an off-state (i.e., a state which causes the heating equipment to be in-operational or to not provide heating to conditioned space 402). Likewise, if HVAC equipment 404 includes cooling equipment configured to provide cooling to conditioned space 402, thermostat 406 may be configured to provide the cooling equipment with a manipulated variable $u_C$ to transition the cooling equipment between an on-state (i.e., a state which causes the cooling equipment to operate to provide cooling to conditioned space 402) and an off-state (i.e., an in-operational state of the cooling equipment). In some embodiments, manipulated variable u represents either $u_H$ or $u_C$.

In some embodiments, thermostat 406 includes sensor 410 and controller 408. In some embodiments, sensor 410 is configured to measure a performance variable y of conditioned space 402. For example, sensor 410 may be a temperature sensor (e.g., a negative temperature coefficient thermistor, a resistance temperature detector, a thermocouple, a semi-conductor based temperature sensor, etc.) configured to measure a temperature of conditioned space 402. In some embodiments, sensor 410 is configured to measure a temperature of conditioned space 402 near thermostat 406. In some embodiments, sensor 410 is configured to measure the average temperature $T_{avg}$ of conditioned space 402. In some embodiments, multiple sensors 410 are disposed about conditioned space 402 and are configured to measure the temperature of conditioned space 402 in multiple locations. In some embodiments, the temperature measured by sensor 410 is the performance variable y. In some embodiments, sensor 410 is configured to measure an indoor air quality (e.g., concentration of airborne particulate in ppm), a humidity sensors configured to measure humidity of conditioned space 402, etc., or any other sensor configured to measure one or more conditions of conditioned space 402. In some embodiments, sensor 410 represents a plurality of the same type of sensors, or a plurality of various types of sensors.

Controller 408 of thermostat 406 is configured to determine values of the manipulated variable u to transition HVAC equipment 404 between various states (e.g., an on-state and an off-state, a cooling state and a heating state, etc.) based on the performance variable y measured by sensor 410, according to some embodiments. In some embodiments, controller 408 is configured to determine the manipulated variable u based on the performance variable y and a setpoint r. The setpoint r may indicate a desired temperature or a desired value of the performance variable y of conditioned space 402. In some embodiments, setpoint r is received via user interface 412 of thermostat 406. For example, a user may input a desired temperature of conditioned space 402 (e.g., 70 degrees Fahrenheit), and controller 408 may use the setpoint r, one or more values of the performance variable y, and a control algorithm to determine u to achieve the setpoint r for conditioned space 402.

In some embodiments, controller 408 receives the setpoint r from user interface 412. In some embodiments, controller 408 displays the performance variable y at user interface 412.

Referring now to FIG. 4B, system 400 is shown, according to some embodiments. System 400 as shown in FIG. 4B operates similarly to or the same as system 400 of FIG. 4A, however, controller 408 is positioned remotely from conditioned space 402. For example, controller 408 may be positioned at HVAC equipment 404, at a remote server, in a back room, etc. In some embodiments, controller 408 receives the performance variable y from sensor 410, the setpoint r, and the deadband DB from user interface 412. In some embodiments, controller 408 is configured to operate similarly as described above in greater detail with reference to FIG. 4A.

On-Off Controller
Thermal Inertia

Figure 5:
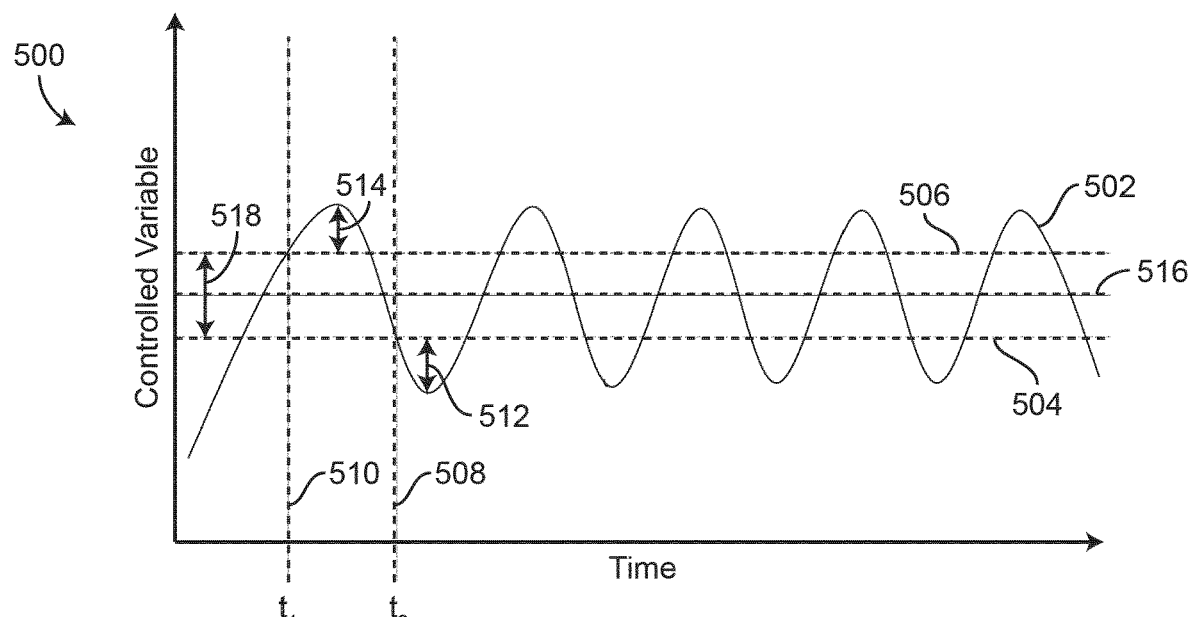
FIG. 5 is a graph of a performance variable over time, demonstrating overshoot and undershoot resulting from conventional on-off control, according to some embodiments.

Referring now to FIG. 5, a graph 500 demonstrates the effect that thermal inertia of a controlled or performance variable y of a plant over time, according to some embodiments. Graph 500 shows values of the controlled variable (the Y-axis) with respect to time (the X-axis). Graph 500 includes series 502 that shows the change of the controlled variable over time, according to some embodiments. Graph 500 also includes a minimum trigger value, represented by minimum threshold 504, and a maximum trigger value, represented by maximum threshold 506. Graph 500 also includes a setpoint or target value of the controlled variable, shown as setpoint 516. Minimum threshold 504 and maximum threshold 506 can be centered about setpoint 516 and offset a distance 518 from each other. Distance 518 is a Y-axis distance, and can be referred to as a deadband. For example, if distance 518 is referred to as variable DB. and the setpoint 516 is referred to as r, then minimum threshold 504 is $$y_{min} = r - \frac{DB}{2}$$

and maximum threshold 506 is $$y_{max} = r + \frac{DB}{2}.$$

When the controlled variable is within deadband 518 (i.e., when $y_{min} < y < y_{max}$), equipment that operates to affect the controlled or performance variable y remains in the same operating state (e.g., cooling on, heating on, cooling off, heating off, etc.). However, if the controlled variable y goes outside of deadband 518 (e.g., exceeds $y_{max}$ or drops below $y_{min}$), equipment that operates to affect the controlled variable y is transitioned between operating modes. For example, if the plant includes HVAC equipment operable to affect a temperatures of a room, and the controlled variable y is the temperature of the room, a thermostat or zone controller can transition the HVAC equipment between an on-state and an off-state (e.g., an operational state and an in-operational state) when the controlled variable y goes outside of deadband 518. For example, in the case of cooling, the thermostat may operate the HVAC equipment in the on-state when the controlled variable y exceeds maximum threshold 506, and operate the HVAC equipment in the off-state when the controlled variable y goes below minimum threshold 504. Likewise, in the case of heating, the thermostat may operate the HVAC equipment in the off-state when the controlled variable y exceeds maximum threshold 506 and in the on-state when the controlled variable y goes below minimum threshold 504.

On/off control (also known as bang-bang control) is a simple and effective control method for HVAC equipment, according to some embodiments. Thermostats typically are setup to regulate the controlled variable y (e.g., the temperature of the room) within a deadband DB around a setpoint r (e.g., 72 degrees Fahrenheit +/−1 degree Fahrenheit). However, many on/off control systems suffer from over and under shooting. For example, as shown in graph 500 at time $t_1$, the controlled variable y exceeds maximum threshold 506, but continues increasing beyond maximum threshold 506 (and overshoots maximum threshold 506 by overshoot amount 514), even after the HVAC equipment is transitioned into a different mode of operation. Likewise, at time $t_2$ the controlled variable y goes below minimum threshold 504, but continues decreasing below minimum threshold 504 (and undershoots minimum threshold 504 by undershoot amount 512) even after the HVAC equipment is transitioned into a different mode of operation. Overshoot and undershoot may typically occur when on/off control is applied to higher order dynamic systems. The time delays of a higher order systems may cause over and undershoot beyond the deadband. This occurs because of inertia in the measured variable that causes it to continue moving (e.g., increasing or decreasing) in a given direction even when the equipment that operates to affect the controlled variable y is operated to affect the controlled variable y in the opposite direction.

Radiant heating systems are one example where there are long time delays between adjusting operation of the equipment (e.g., transitioning the HVAC equipment between the on-state and the off-state) and the response of the controlled variable y. The systems and methods described herein provide a way to decrease the overshoot and undershoot, thereby improving the functionality of on/off control systems. Additionally, the systems and methods described herein are designed to be as simple as possible so that they can be added to an existing thermostat control system, without requiring changes to the control logic used by the thermostat.

Control System Theory

Figure 6:
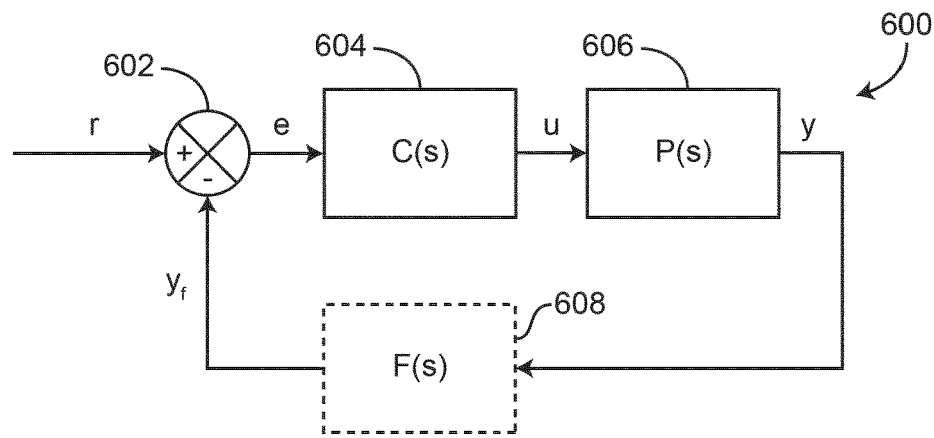
FIG. 6 is a block diagram of an on-off control system including a feedback controller, a summing junction, a plant, and a filter, according to some embodiments.

Referring now to FIG. 6, a block diagram of a control system 600 is shown, according to some embodiments. Control system 600 includes a feedback controller 604, a plant 606, a summing junction 602, and a filter 608. In some embodiments, plant 606 is a plant of building 10. In some embodiments, plant 606 receives a value of a manipulated variable u as an input, and outputs a value of the controlled or performance variable y. Plant 606 is shown represented by transfer function P(s). In some embodiments, the value of the manipulated variable u is a command to transition HVAC equipment between an on-state and an off-state for either heating or cooling.

Feedback controller 604 can be an on-off controller, a deadband controller, a PID controller, etc., or any other feedback controller that generates/determines values of the manipulated variable u and provides the values of the manipulated variable u to plant 606 as an input. In some embodiments, summing junction 602 is configured to receive a value of the performance variable y from plant 606, or a value of a filtered performance variable $y_f$ from filter 608. Summing junction 602 also receives a value of the setpoint r. Summing junction 602 can be configured to determine a difference (i.e., an error e) between the value of the setpoint r and the value of the performance variable y. In some embodiments, summing junction 602 determines a difference (i.e., the error e) between the value of the setpoint r and the value of the filtered performance variable $y_f$. In some embodiments, summing junction 602 provides the difference or the error e to feedback controller 604 as an input. Feedback controller 604 uses the difference or the error e to determine the value of the manipulated variable u for plant 606. In some embodiments, feedback controller 604 is characterized by the transfer function C(s). In some embodiments, filter 608 is characterized by the transfer function F(s).

The transfer function of plant 606 can be characterized as a first-order plus time delay system, shown in Equation (1) below:

$$P(s) = \frac{K_p e^{-Ls}}{\tau_p s + 1} \quad (1)$$

where L is the time delay of plant 606 (or any other parameter of plant 606 such as a response characteristic), $K_p$ is gain of plant 606, and $\tau_p$ is the time constant of plant 606. In some embodiments, plant 606 is characterized by a higher-order transfer function. It should be understood that the systems and methods described herein may be used for higher order systems, and that plant 606 is characterized as a first-order system for ease of explanation. It should be understood that characterizing plant 606 as a first order system does not limit the intended scope of the embodiments described herein.

The time delay L (e.g., a response characteristic) of plant 606 can lead to under and overshoot in a thermostat controller since turning plant 606 on or off does not affect the temperature (the performance variable y) until the time delay L has passed. One way to account for the time delay L of plant 606 is to introduce a new transfer function $F(s)=e^{Ls}$ in series with plant 606 to remove (e.g., account for) the time delay L. For example, the transfer function (Equation (1)) can be modified as:

$$F(s)P(s) = e^{Ls} \frac{K_p e^{-Ls}}{\tau_p s + 1} \quad (2)$$

which reduces to:

$$F(s)P(s) = \frac{K_p}{(\tau_p s + 1)} \quad (3)$$

according to some embodiments. However, this solution is not feasible since $F(s)=e^{Ls}$ is not physically realizable.

Accordingly, the transfer function $F(s)=e^{Ls}$ can be approximated using a standard exponential expansion.

Specifically, the transfer function F(s) shown in Equation (4) below:

$$F(s)=e^{Ls} \quad (4)$$

can be expanded as:

$$F(s) = \lim_{n \to \infty} \left(1 + \frac{Ls}{n}\right)^n \quad (5)$$

where the expansion can be truncated to some arbitrary n. The transfer function F(s) of filter 608 expanded to a given n can be implemented as shown in FIG. 6 to receive the performance variable y as an input and output the filtered performance variable $y_f$. In some embodiments, filter 608 is positioned in the feedback loop of control system 600, such that the filtered performance variable $y_f$ is provided to summing junction 602 and used to determine the error e. Advantageously, the control logic of feedback controller 604 does not need to be adjusted to achieve the advantages of control system 600.

Figure 7:
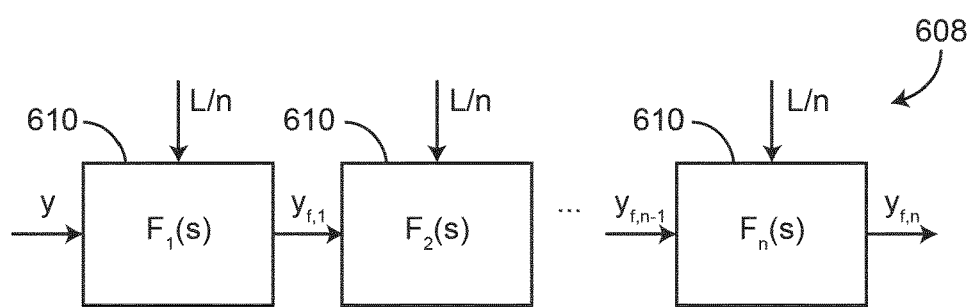
FIG. 7 is a block diagram of the filter of FIG. 6, according to some embodiments.

Referring now to FIG. 7, filter 608 is shown in greater detail, according to some embodiments. In some embodiments, for the practical implementation of filter 608 in a digital controller, multiple first order filters 610 are implemented in series rather than a higher order filter 608 of the nth order. In order to implement filter 608 in a digital controller, the continuous-time form of the transfer function F(s) of filter 608 should be converted to discrete time, according to some embodiments. Since a continuous time pole/zero (s−α) maps to a discrete time pole/zero (z−$e^{\alpha \Delta t}$) where $\Delta t$ is the sample period, filter 608 is expressed as:

$$F(s) = \lim_{n \to \infty} \left[\frac{L}{n}\left(\frac{n}{L} + s\right)\right]^n \quad (6)$$

according to some embodiments.

Equation (6) shown above can then be modified to include a sample delay $z^{-1}$ to yield:

$$F(z) = \lim_{n \to \infty} \left[z^{-1}\left(\frac{z - e^{-\Delta t\left(\frac{n}{L}\right)}}{1 - e^{-\Delta t\left(\frac{n}{L}\right)}}\right)\right]^n \quad (7)$$

where the denominator inside the limit term ensures that the (steady state) gain of the discrete filter 608 is the same as the unity gain of the continuous filter 608. In some embodiments, filter 608 is configured such that the steady state gain of the discrete filter 608 is the same as the unity gain of the continuous filter 608 when s=0 and z=1.

In order to implement filter 608 as a series of first order filters 610 (shown in FIG. 7), each of the digital realizations of first order filters 610 can be expressed as:

$$f_{k,i} = \frac{u_k - \lambda u_{k-1}}{1 - \lambda} \quad (8)$$

where i is the filter number (e.g., an integer from i=1 to i=n), n is the total number of filters 610, and $$\lambda = e^{\left(-\Delta t \frac{n}{L}\right)}.$$

The output of filters 610 (e.g., $y_{f,i}$ or $f_{k,i}$) is $f_{k,i}$ at sample k and $u_k$ is the input and $u_{k-1}$ is the previous input, according to some embodiments. In this way, filters 610 can be positioned in series, with the outputs of previous filters being provided as the input to the next consecutive one of filters 610. In some embodiments, only one of filters 610 is used.

Controller

Figure 10:
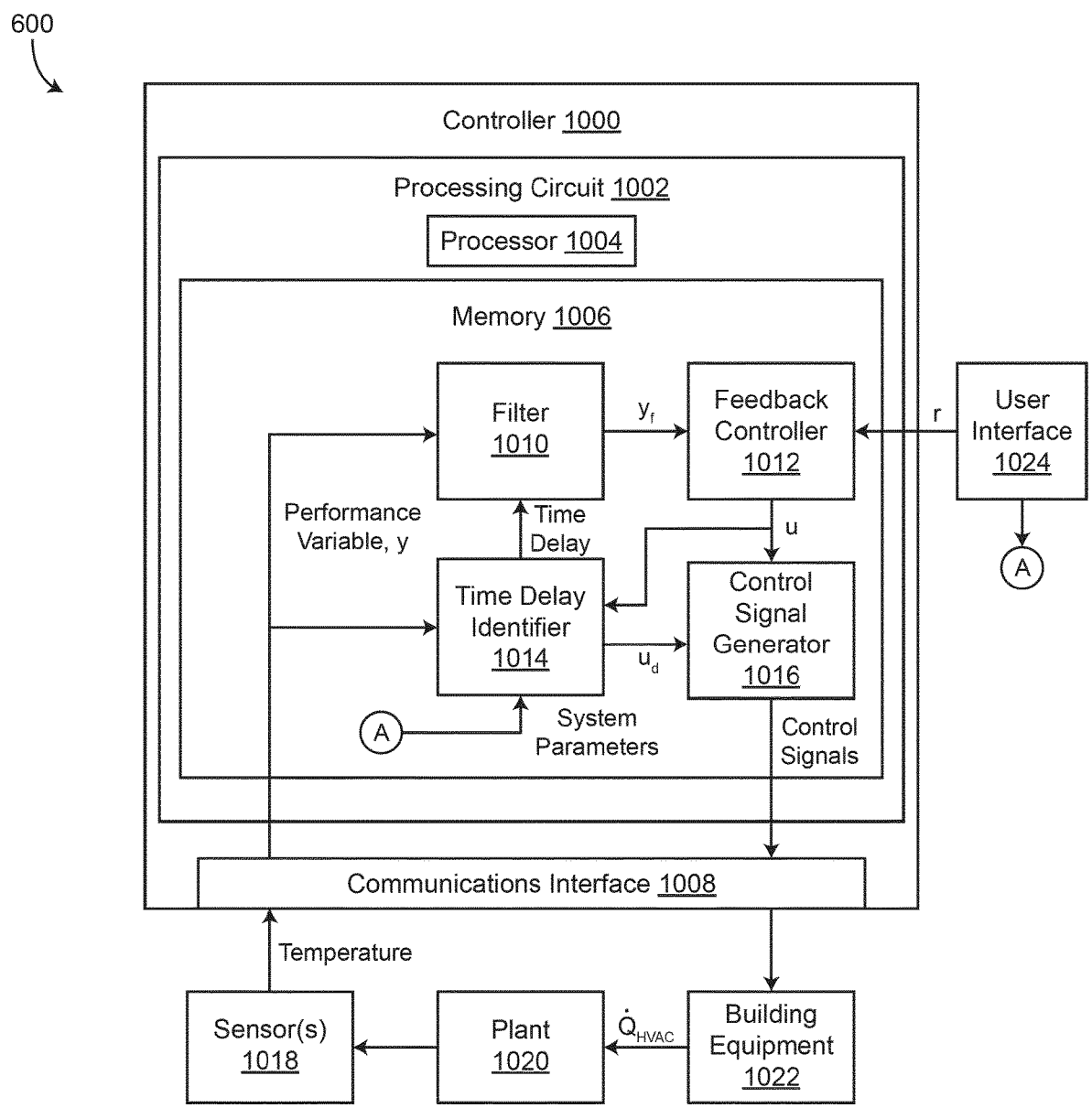
FIG. 10 is a block diagram of the on-off control system of FIG. 6, according to some embodiments.

Referring now to FIG. 10, control system 600 is shown, according to some embodiments. Control system 600 includes controller 1000, according to some embodiments. In some embodiments, controller 1000 is the same as or similar to controller 408. Controller 1000 is configured to perform any of the functionalities or techniques of summing junction 602, filter 608, and feedback controller 604, as described in greater detail above with reference to FIGS. 6 and 7. In some embodiments, controller 1000 is a thermostat (e.g., thermostat 406) of a space (e.g., conditioned space 402) or room. It should be understood that controller 1000 or any of the functionality of controller 1000 can be performed locally (e.g., at plant 1020), remotely (e.g., in a cloud-computing system) or distributed across one or more local and/or remote devices.

Controller 1000 can include a communications interface 1008. Communications interface 1008 may facilitate communications between controller 1000 and external systems, devices, sensors, etc. (e.g., sensors 1018, building equipment 1022, user interface 1024, a user device, a human machine interface, etc.) for allowing user control, monitoring, and adjustment to any of the communicably connected devices, sensors, systems, primary movers, etc. Communications interface 1008 may also facilitate communications between controller 1000 and a human machine interface. Communications interface 1008 may facilitate communications between controller 1000 and sensor(s) 1018, building equipment 1022, user interface 1024, etc.

Communications interface 1008 can be or include wired or wireless communications interfaces (e.g., jacks, antennas, transmitters, receivers, transceivers, wire terminals, etc.) for conducting data communications with sensors, devices, systems, nozzles, etc., of control system 600 or other external systems or devices (e.g., user interface 1024, a building controller, a building management system, etc.). In various embodiments, communications via communications interface 1008 can be direct (e.g., local wired or wireless communications) or via a communications network (e.g., a WAN, the Internet, a cellular network, etc.). For example, communications interface 1008 can include an Ethernet card and port for sending and receiving data via an Ethernet-based communications link or network. In another example, communications interface 1008 can include a Wi-Fi transceiver for communicating via a wireless communications network. In some embodiments, the communications interface is or includes a power line communications interface. In other embodiments, communications interface 1008 is or includes an Ethernet interface, a USB interface, a serial communications interface, a parallel communications interface, etc.

Controller 1000 includes a processing circuit 1002, processor 1004, and memory 1006, according to some embodiments. Processing circuit 1002 can be communicably connected to communications interface 1008 such that processing circuit 1002 and the various components thereof can send and receive data via the communications interface. Processor 1004 can be implemented as a general purpose processor, an application specific integrated circuit (ASIC), one or more field programmable gate arrays (FPGAs), a group of processing components, or other suitable electronic processing components.

Memory 1006 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1006 can be or include volatile memory or non-volatile memory. Memory 1006 can include database components, object code components, script components, or any other type of information structure for supporting the various activities and information structures described in the present application. According to some embodiments, memory 1006 is communicably connected to processor 1004 via processing circuit 1002 and includes computer code for executing (e.g., by processing circuit 1002 and/or processor 1004) one or more processes described herein.

Referring still to FIG. 10, controller 1000 is configured to generate control signals and provide the control signals to building equipment 1022 of plant 1020, according to some embodiments. Building equipment 1022 can be any HVAC equipment (e.g., VAV equipment, VRF equipment, a packaged air conditioner, HVAC equipment 404, etc.) that operates to affect an environmental condition or a variable state of a space, a room, etc., of plant 1020. In some embodiments, building equipment 1022 is operable between various modes. In some embodiments, building equipment 1022 is configured to transition between an on-state and an off-state for any of the various modes of operation.

Building equipment 1022 provides heating or cooling to the space of plant 1020, shown as $\dot{Q}_{HVAC}$, according to some embodiments. In some embodiments, plant 1020 is plant 606 and can be modeled using a first order transfer function, or a higher order transfer function. In some embodiments, controller 1000 functions without requiring a model or a transfer function of plant 606. In some embodiments, the performance variable y (e.g., temperature, zone temperature, indoor temperature, etc.) of plant 1020 can be measured by sensor(s) 1018. In some embodiments, sensor(s) 1018 is or includes sensor 410. Sensors 1018 can be any temperature sensor, humidity sensor, etc., configured to measure/obtain a value of the performance variable y (e.g., indoor air temperature). In some embodiments, sensor(s) 1018 are configured to provide the measured/obtained value of the performance variable y to controller 1000 via communications interface 1008. Controller 1000 uses the values of the performance variable y as feedback to determine control signals for building equipment 1022, according to some embodiments.

Referring still to FIG. 10, memory 1006 includes time delay identifier 1014, according to some embodiments. In some embodiments, time delay identifier 1014 is configured to estimate the time delay L of plant 1020. Time delay identifier 1014 can receive values of the performance variable y in addition to values of a manipulated variable u. For example, once controller 1000 transitions building equipment 1022 between the on-state and the off-state, time delay identifier 1014 can collect values of the performance variable y and use the values of the performance variable y to estimate the time delay L of plant 1020 or to estimate any other parameter, response characteristic, etc., of plant 1020. In some embodiments, time delay identifier 1014 tracks the rate of change of the performance variable y over time and determines an amount of time (e.g., the time delay L) that it takes plant 1020 to respond to changing the operation of building equipment 1022. In some embodiments, time delay identifier 1014 is configured to provide the estimated time delay L to filter 1010. In some embodiments, time delay identifier 1014 generates or selects a time delay parameter $L_{parameter}$ or any other response characteristic or parameter and provides the time delay parameter $L_{parameter}$ to filter 1010.

Time delay identifier 1014 can excite or perturb plant 1020 by providing a perturbed or excited input $u_d$ to plant 1020 using building equipment 1022. In some embodiments, time delay identifier 1014 receives values of the performance variable y as feedback from the excited/perturbed plant 1020 and calculates the time delay L of plant 1020 based on the feedback. In some embodiments, the time delay L is an amount of time that elapses between a first time at which building equipment 1022 (or a stage of building equipment 1022) transitions between the on-state and the off-state and a second time at which the performance variable y begins to change. In some embodiments, the time delay L is an amount of time that elapses between a first time at which building equipment 1022 (or a stage of building equipment 1022) transitions between the on-state and the off-state and a second time at which the performance variable y changes by a predetermined amount. It should be understood that, in some embodiments, a parameter is used in addition to or in place of the time delay L. For example, any response characteristic, dynamic response characteristic, parameter, etc., of a plant may be used in place of or in addition to the time delay L. It should be understood that, as used throughout the present disclosure, "the time delay L" and "the time delay parameter $L_{parameter}$" may refer to any parameter (e.g., a time delay, a delay parameter, a time constant, a response characteristic, etc.) that can represent, express, characterize, etc., a response of plant 1020, regardless of whether plant 1020 exhibits a pure time delay response (e.g., there is no response for a period of time L after changing control inputs) or a second order response (e.g., an "s" shape) where plant 1020 begins to respond to the control inputs immediately but the change in the performance variable y is much smaller than for a pure time delay.

Time delay identifier 1014 can also select the time delay L (or any other response characteristic or parameter that characterizes a response of plant 1020) from a database based on system parameters received from user interface 1024. In some embodiments, time delay identifier 1014 receives system parameters relating to building equipment 1022, plant 1020, an HVAC system that serves plant 1020, control system 600, etc. For example, the user can be prompted to enter, via user interface 1024, a type of HVAC system that controller 1000 is configured to operate, or a type of building equipment 1022. In another example, the user can be prompted to enter, via user interface 1024, a size of a space of plant 1020 for which building equipment 1022 is configured to provide heating and/or cooling. Time delay identifier 1014 can select a suitable value of the time delay L that corresponds to the various system parameters (e.g., system type, HVAC equipment type, space size, building/plant information, etc.) and provide the selected time delay L to filter 1010.

In some embodiments, time delay identifier 1014 periodically checks to ensure that the time delay parameter $L_{parameter}$ that is currently used by controller 1000 accurately represents the time delay L of plant 1020. Time delay identifier 1014 can adjust (e.g., increase or decrease) the time delay parameter $L_{parameter}$ and provide the adjusted time delay parameter to filter 1010 for use. In some embodiments, time delay identifier 1014 uses a neural network and observes values of the performance variable y received from plant 1020 (e.g., from sensors 1018) to determine if the time delay parameter $L_{parameter}$ should be adjusted. In some embodiments, time delay identifier 1014 receives an indication from user interface 1024 that the time delay of plant 1020 has changed and adjusts the time delay parameter $L_{parameter}$ in response to receiving the indication from user interface 1024. In some embodiments, time delay identifier 1014 automatically detects changes in the time delay of plant 1020 (e.g., using a neural network) based on values of the performance variable y received as feedback from plant 1020 and automatically adjusts the time delay parameter $L_{parameter}$ to account for the change in the time delay of plant 1020. Advantageously, controller 1000 can detect changing conditions of plant 1020 and adjust or adapt the time delay parameter $L_{parameter}$ in response to changing conditions of plant 1020.

Filter 1010 can be a predictor that predicts values of the performance variable y over a future time horizon and adjusts the performance variable y to account for (e.g., to reduce the impact of, to negate the impact of, to invert, etc.) the time delay L of plant 1020. In some embodiments, filter 1010 is a transfer function that approximates an exponential expansion. Filter 1010 can use a predictive model that anticipates or predicts the values of the performance variable y to determine if the performance variable y should be increased or decreased to account for the time delay L of plant 1020. In some embodiments, filter 1010 uses a model generated by a neural network to anticipate or predict the values of the performance variable y over the future time horizon. In some embodiments, filter 1010 anticipates or predicts an impact of the time delay L on the performance variable y and artificially increases or decreases the performance variable y to account for or mitigate/negate the impact of the time delay L on the performance variable. The artificially increased or decreased values of the performance variable y can be referred to as filtered performance variable $y_f$. Filter 1010 can explicitly or directly anticipate/predict the performance variable y over the future time horizon and artificially increase or decrease the performance variable y to account for the time delay L of plant 1020. In some embodiments, filter 1010 indirectly or implicitly anticipates or predicts the values of the performance variable y by inverting the time delay L and artificially adjusting (e.g., increasing or decreasing) the performance variable y. The artificially adjusted (e.g., increased or decreased) values of the performance variable y can be provided to feedback controller 1012. Advantageously, filter 1010 can be used to reduce an impact of thermal inertia or time delay L of plant 1020, thereby reducing over and undershoot of the performance variable y.

Filter 1010 is configured to receive values of the performance variable y (e.g., room temperature) from sensor(s) 1018, according to some embodiments. In some embodiments, filter 1010 is the same as or similar to filter 608. For example, filter 1010 can receive the value of the performance variable y and provide the filtered value of the performance variable $y_f$ to feedback controller 1012. In some embodiments, filter 1010 is a single filter (e.g., n=1) and uses Equation (7) (shown above) to determine the filtered value of the performance variable $y_f$ based on the value(s) of the performance variable y received from sensor(s) 1018. In some embodiments, filter 1010 is or includes multiple first order filters 610 in series (e.g., n>1). Filter 1010 can use Equation (8) for the series of first order filters 610 to determine the value of the filtered performance variable $y_f$ based on the value(s) of the performance variable y. In some embodiments, the value(s) of the performance variable y are smoothed before being input to filter 1010. Filter 1010 can be configured to apply a smoothing function to the value(s) of the performance variable y before inputting the performance variable y to Equation (7) or to Equation (8). Advantageously, if the values of the performance variable y are noisy, this reduces the likelihood that filter 1010 will amplify the noise. In some embodiments, the values of the performance variable y are smoothed if the signal is known to be noisy.

Filter 1010 provides the value(s) of the filtered performance variable $y_f$ to feedback controller 1012, according to some embodiments. In some embodiments, feedback controller 1012 is configured to use the value(s) of the filtered performance variable $y_f$ to generate a value of the manipulated variable u. In some embodiments, feedback controller 1012 is configured to receive a value of the setpoint r from user interface 1024. In some embodiments, user interface 1024 is or includes user interface 412. For example, a user can indicate a desired temperature, or a desired value of the controlled/performance variable y at user interface 1024. In some embodiments, the user can also input a mode of operation (e.g., heating mode, cooling mode, standby, etc.) to feedback controller 1012 through user interface 1024. User interface 1024 may be positioned in a space that controller 1000 is configured to serve. Feedback controller 1012 can use a deadband (e.g., deadband 518) and the value of the setpoint r to determine the value of the manipulated variable u. In some embodiments, the manipulated variable u is a binary variable (e.g., 1 or 0), with u=1 indicating that building equipment 1022 should be operated in the on-state, while u=0 indicating that building equipment 1022 should be operated in the off-state.

Feedback controller 1012 can determine the value of the manipulated variable u based on whether or not the value of the filtered performance variable $y_f$ is within the deadband. For example, if the value of the filtered performance variable $y_f$ exceeds a maximum threshold defined by the deadband, feedback controller 1012 may determine that u=1 (e.g., if building equipment 1022 is in a cooling mode). Likewise, if the value of the filtered performance variable $y_f$ goes below a minimum threshold defined by the deadband, feedback controller 1012 may determine that u=0 (e.g., if building equipment 1022 is in the cooling mode). Feedback controller 1012 can be the same as or similar to feedback controller 604.

Feedback controller 1012 performs on-off or deadband control to determine the value of the manipulated variable u and provides the value of the manipulated variable u to control signal generator 1016. In some embodiments, feedback controller 1012 also provides the value of the manipulated variable u to time delay identifier 1014 so that time delay identifier 1014 is notified of when building equipment 1022 changes state. In some embodiments, control signal generator 1016 receives the value of the manipulated variable u from feedback controller 1012 and generates control signals for building equipment 1022 based on the value of the manipulated variable u. Control signal generator 1016 may generate control signals for building equipment 1022 that transition building equipment 1022 between the on-state and the off-state, or transition building equipment 1022 between the various modes (e.g., heating mode, cooling mode, etc.). Building equipment 1022 receives the control signals from control signal generator 1016 via communications interface 1008 and operates to affect the temperature or the performance variable of plant 1020 (e.g., by providing heating or cooling).

In some embodiments, time delay identifier 1014 determines various values of the time delay L for various modes of operation of building equipment 1022. For example, operating building equipment 1022 in a first mode (e.g., heating) may be associated with a first value of the time delay L of plant 1020, while operating building equipment 1022 in a second mode (e.g., cooling) may be associated with a second, different, value of the time delay L of plant 1020. In some embodiments, time delay identifier 1014 provides the value(s) of the time delay L of plant 1020 to filter 1010. Filter 1010 can use the value(s) of the time delay L of plant 1020 to determine or obtain the value of the filtered performance variable $y_f$ In some embodiments, filter 1010 inputs the value of the time delay L of plant 1020 to Equation (7) or to Equation (8).

In some embodiments, filter 1010 uses a predetermined or stored value of the time delay L of plant 1020. For example, controller 1000 may store various typical or common values of time delays L of various types of plants 1020. Filter 1010 can retrieve and use an appropriate value of the time delay L from a database (e.g., stored locally in memory 1006, or remotely). In some embodiments, the time delay L of plant 1020 is selected based on a type of plant 1020. For example, radiative heating systems may typically have a certain value of the time delay L, while packaged air conditioning systems may have different typical values of the time delay L, etc.

Advantageously, filter 1010 can be implemented without adjusting the control logic of feedback controller 1012. This allows filter 1010 to be used based on the time delay L of plant 1020 without requiring reprogramming of feedback controller 1012. Filter 1010 can be easily implemented on controller 1000 by providing an update to the logic of controller 1000 without requiring reprogramming of feedback controller 1012.

Simulation Test Results

Figure 8:
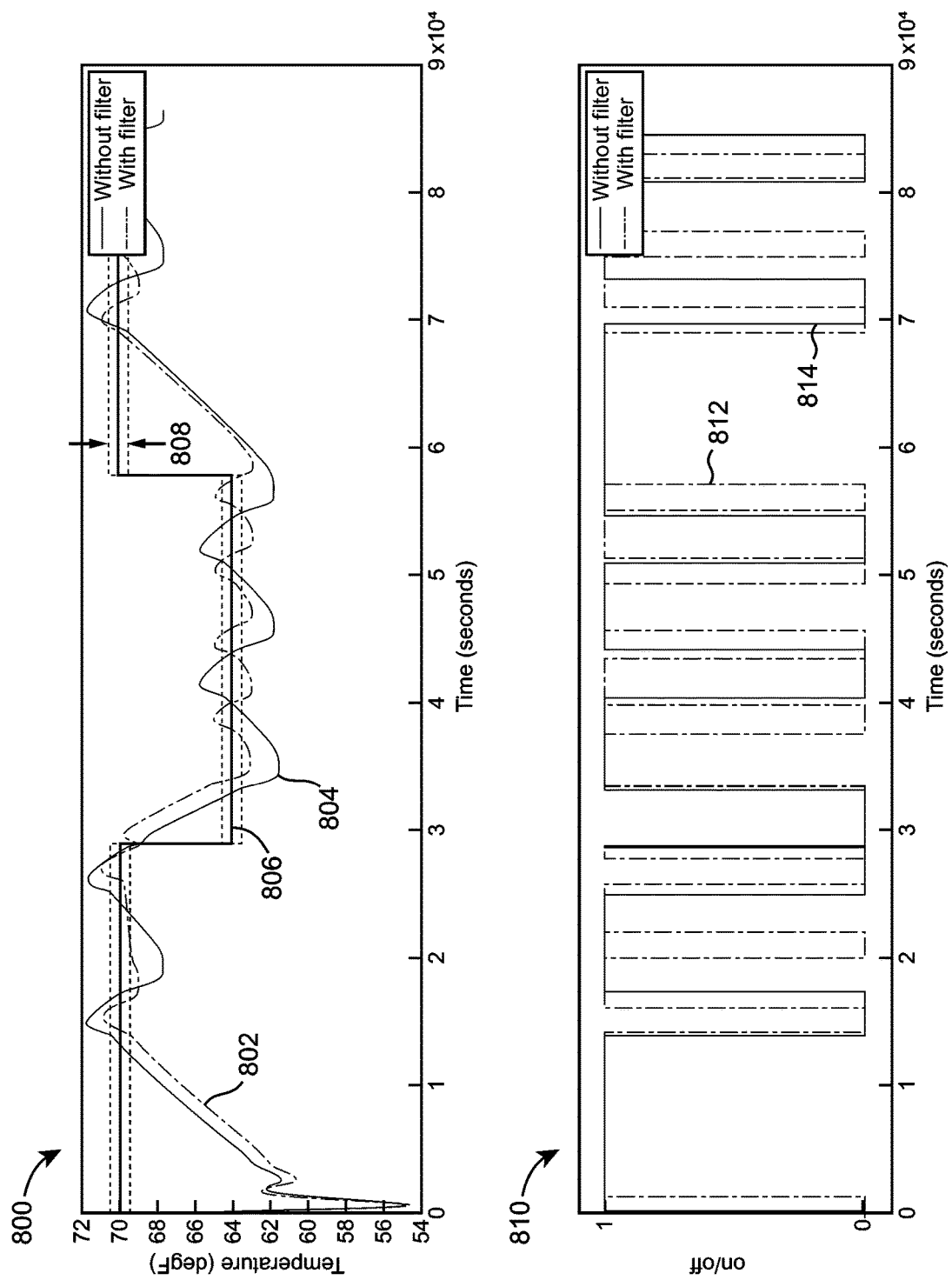
FIG. 8 is a graph showing the improvements in over and undershoot for a system using the filter of FIG. 6, according to some embodiments.
Figure 9:
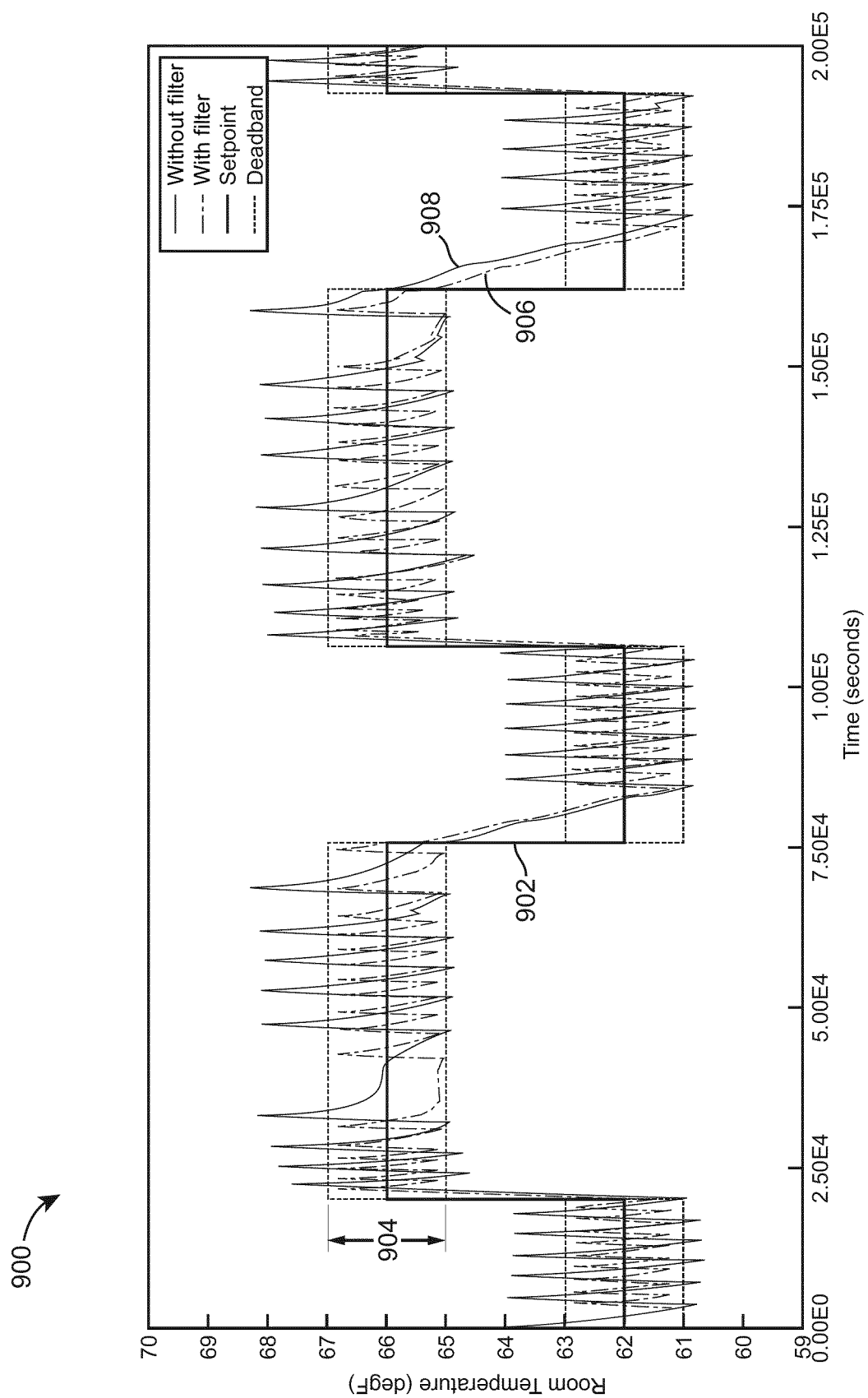
FIG. 9 is a graph showing simulation results for an on-off control system that uses a filtered performance variable, and an on-off control system that does not use a filtered performance variable, according to some embodiments.

Referring now to FIGS. 8 and 9, graphs 800, 810, and 900 demonstrate the effectiveness of control system 600 and controller 1000, according to some embodiments. Graphs 800 and 810 shown in FIG. 8 demonstrate simulation results for a plant using both control system 600 with filter 1010, and control system 600 without filter 1010. Graph 900 as shown in FIG. 9 shows simulation results of a Modelica room model using both control system 600 with filter 1010, and control system 600 without filter 1010.

Referring particularly to FIG. 8, graph 800 shows temperature (the Y-axis) of a space or room with respect to time (the X-axis). Graph 800 represents simulation results for a radiant heating system model. Graph 800 includes series 802 and series 804. Series 802 represents the temperature (e.g., the performance variable y) of a room or space that control system 600 serves. Series 802 shows the simulation results for the case when controller 1000 of control system 600 includes filter 1010, according to some embodiments. Series 804 shows the simulation results for the case when controller 1000 does not include filter 1010. The value of the time delay L used by filter 1010 for series 802 was 20 minutes.

Graph 800 includes a setpoint series 806. Setpoint series 806 shows the value of the setpoint variable r over time, according to some embodiments. Graph 800 also includes a deadband 808, centered about setpoint series 806.

As shown in graph 800, series 802 (control system 600 with filter 1010) results in less over and undershoot of deadband 808 when compared to series 804 (control system 600 without filter 1010). Advantageously, reducing the over and undershoot of the performance variable y improves the controllability of control system 600, and maintains the performance variable y closer to the setpoint r. This can result in improved occupant comfort. As shown in graph 800, series 804 over and undershoots deadband 808 significantly. However, the overshoot and undershoot are reduced significantly by using filter 1010 (represented by series 802).

Graph 810 is shown to include series 812 and series 814. Graph 810 shows the value of the manipulated variable u (the Y-axis) with respect to time (the X-axis), according to some embodiments. Series 812 shows the on/off control decisions associated with control system 600 that uses filter 1010. Series 814 shows the on/off control decisions associated with control system 600 that does not use filter 1010.

Referring particularly to FIG. 9, graph 900 shows simulation results of a Modelica room model using both control system 600 with filter 1010 (represented by series 906) and control system 600 without filter 1010 (represented by series 908). Graph 900 shows the value of the performance variable y (the Y-axis) with respect to time (the X-axis). Graph 900 includes a setpoint series 902 with a deadband 904 centered about setpoint series 902. As shown in graph 900, series 908 (control system 600 without filter 1010) largely overshoots and undershoots deadband 904. However, series 906 (control system 600 with filter 1010) maintains the performance variable y (e.g., room temperature) within deadband 904. The value of the time delay for the plant used to generate the simulation results shown in graph 900 was estimated at approximately 10 minutes and used in filter 1010, according to some embodiments.

Process

Figure 11:
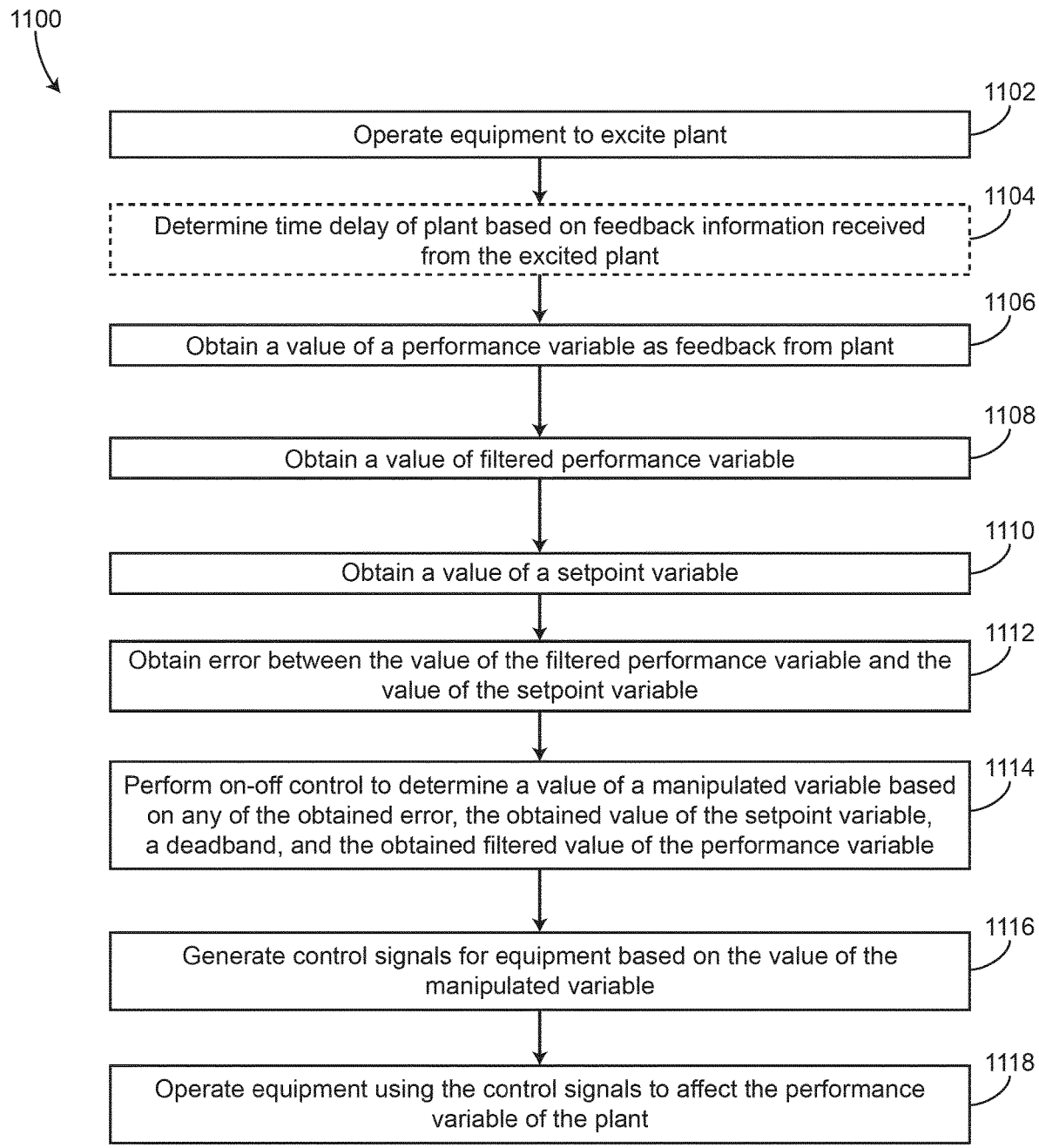
FIG. 11 is a flow diagram of a process for performing on-off control and filtering a performance variable of a plant, according to some embodiments.

Referring now to FIG. 11, a process 1100 for performing on-off control for a plant is shown, according to some embodiments. Process 1100 can be performed by a controller (e.g., controller 1000), a thermostat, etc., or by any other on/off or deadband controller. In some embodiments, process 1100 includes optional step 1104.

Process 1100 includes operating equipment to excite a plant (step 1102), according to some embodiments. In some embodiments, step 1102 is performed by controller 1000 and building equipment 1022. Control signal generator 1016 may generate control signals and provide the control signals to building equipment 1022 to affect a performance variable of plant 1020. The performance variable can be humidity, temperature, relative humidity, etc., or any other measureable variable of plant 1020 that the equipment operates to affect.

Process 1100 includes determining a time delay of the plant based on feedback information received from the excited plant (step 1104), according to some embodiments. In some embodiments, step 1104 is optional. Step 1104 may be performed by time delay identifier 1014. The feedback information can be values of the performance variable y or values of a filtered performance variable $y_f$. In some embodiments, the values of the performance variable y are measured by sensor(s) 1018. In some embodiments, the values of the performance variable are provided to time delay identifier 1014 and used by time delay identifier 1014 to determine the time delay L of the plant.

In some embodiments, the value of the time delay L of plant 1020 is selected from a database of various time delay values. The value of the time delay L can be selected based on a type of the equipment, a type of plant 1020, a size of plant 1020, known properties of plant 1020, etc. For example, the time delay L may be a known value.

Process 1100 includes obtaining a value of a performance variable as feedback from the plant (step 1106), according to some embodiments. In some embodiments, step 1106 is performed by sensor(s) 1018. In some embodiments, sensor(s) 1018 are configured to measure the performance variable y of the plant and provide the measurements of the performance variable y of the plant to filter 1010 to perform step 1106. In some embodiments, a single value of the performance variable y of the plant is provided to filter 1010. In some embodiments, multiple values of the performance variable y of the plant are provided to filter 1010.

Process 1100 includes obtaining a value of a filtered performance variable $y_f$ (step 1108), according to some embodiments. In some embodiments, step 1108 is performed by filter 1010. Filter 1010 can be configured to use Equation (7) or Equation (8) shown above to determine the filtered performance variable $y_f$. In some embodiments, the filtered performance variable is obtained by filter 1010 using the value of the time delay L of the plant.

Process 1100 includes obtaining a value of a setpoint variable r (step 1110), according to some embodiments. In some embodiments, the value of the setpoint variable r is received by feedback controller 1012 of controller 1000 from user interface 1024. In some embodiments, the value of the setpoint variable r indicates a desired value or a target value of the performance variable y.

Process 1100 includes obtaining an error e between the value of the filtered performance variable $y_f$ and the value of the setpoint variable r (step 1112), according to some embodiments. In some embodiments, step 1112 is performed by feedback controller 1012. In some embodiments, step 1112 is performed by summing junction 602. In some embodiments, step 1112 includes determining a difference between the value of the filtered performance variable $y_f$ and the value of the setpoint variable r.

Process 1100 includes performing on-off control to determine a value of a manipulated variable u based on any of the obtained error e, the obtained value of the setpoint variable r, a deadband, and the obtained value of the filtered performance variable $y_f$ (step 1114), according to some embodiments. In some embodiments, step 1114 is performed by feedback controller 1012. Feedback controller 1012 can use the deadband, the setpoint, and the value of the filtered performance variable $y_f$ to determine the value of the manipulated variable u. In some embodiments, the value of the manipulated variable u is a binary value (e.g., 1 or 0).

Process 1100 includes generating control signals for the equipment based on the value of the manipulated variable u (step 1116), according to some embodiments. In some embodiments, step 1116 is performed by control signal generator 1016 based on the value of the manipulated variable u.

Process 1100 includes operating the equipment using the control signals to affect the performance variable of the plant (step 1118), according to some embodiments. In some embodiments, step 1118 is performed by building equipment 1022. In some embodiments, building equipment 1022 uses the control signals generated by control signal generator 1016 (e.g., generated in step 1116) and provides heating or cooling to plant 1020 to affect the performance variable y (e.g., to affect the temperature of a space or room of plant 1020).

Figure 12:
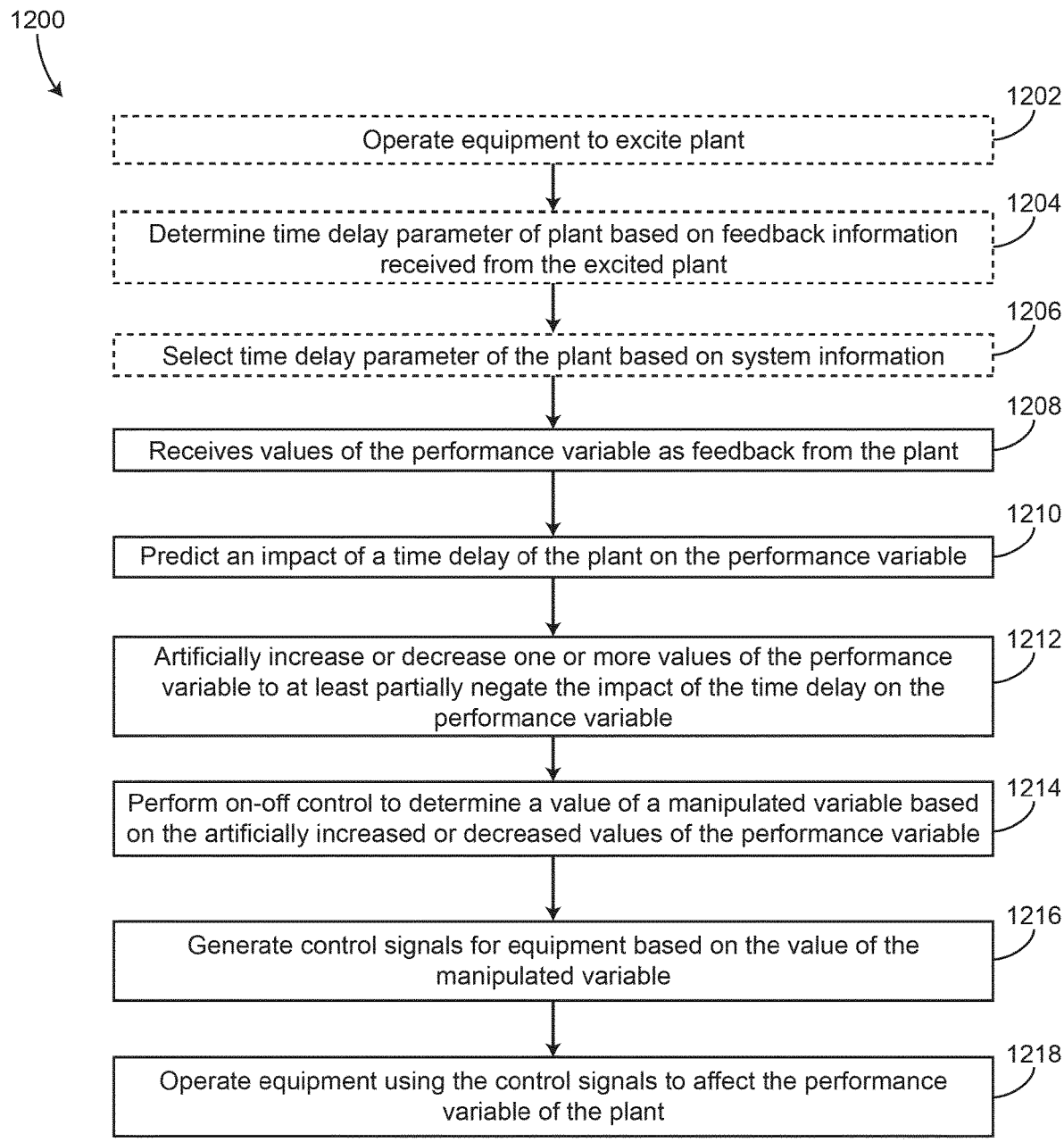
FIG. 12 is a flow diagram of a process for performing on-off control and artificially adjusting a performance variable of a plant, according to some embodiments.

Referring now to FIG. 12, a process 1200 for performing on-off control for a plant is shown, according to some embodiments. Process 1200 can include steps 1202-1218. In some embodiments, process 1200 is performed by controller 1000. Process 1200 can be performed by controller 1000 to adjust values of the performance variable y to account for, reduce, invert, negate, etc., an impact or effect of the time delay L of the plant.

Process 1200 includes operating equipment to excite the plant (step 1202), according to some embodiments. In some embodiments, step 1202 is the same as or similar to step 1102 of process 1100. In some embodiments, step 1202 includes operating building equipment 1022 to affect the performance variable y (e.g., temperature, humidity, etc.) of plant 1020. In some embodiments, steps 1202-1204 are optional.

Process 1200 includes determining a time delay parameter based on feedback information (e.g., values of the performance variable y) received from the excited plant (step 1204), according to some embodiments. In some embodiments, step 1204 includes determining a value of the time delay parameter based on an amount of time that elapses between a change in operation of building equipment 1022 and a time at which the operation of building equipment 1022 affects the performance variable y of plant 1020. For example, the time delay parameter can be an amount of time that elapses between a first time at which building equipment 1022 is transitioned between the on-state and the off-state and a second time at which the performance variable y begins to change as a result of the transition of building equipment 1022. In some embodiments, the time delay parameter is an amount of time that elapses between a first time at which building equipment 1022 is transitioned between the on-state and the off-state and a second time at which the performance variable y changes (e.g., increases or decreases) a threshold amount (e.g., a certain percentage, a certain amount, a standard deviation, half a standard deviation, a measureable amount, etc.) as a result of the transition of building equipment 1022.

For example, if building equipment 1022 is transitioned from the on-state to the off-state at time $t=t_1$, time delay identifier 1014 can monitor the performance variable y until the performance variable y changes at least an amount $\Delta y_{threshold}$. The time that the performance variable y changes at least the threshold amount $\Delta y_{threshold}$ can be recorded as time $t=t_2$. Time delay identifier 1014 can determine the time delay parameter (referred to as $L_{parameter}$) as a difference between time $t_1$ and time $t_2$ (e.g., $L_{parameter}=t_1-t_2$ or $L_{parameter}=t_2-t_1$ or $L_{parameter}=|t_2-t_1|$, or can determine the time delay parameter $L_{parameter}$ based on the difference between time $t_1$ and time $t_2$ (e.g., $L_{parameter}=f(\Delta t)$ where $\Delta t=|t_2-t_1|$).

In some embodiments, step 1204 includes using a neural network to determine the time delay parameter $L_{parameter}$ of the plant. The neural network can use any of the values of the performance variable, various system information, etc., to determine the time delay parameter $L_{parameter}$ of the plant. In some embodiments, the time delay parameter $L_{parameter}$ is an adjustable time delay parameter. Time delay identifier 1014 can adjust (e.g., increase or decrease) the time delay parameter $L_{parameter}$ in response to the time delay L of plant 1020 changing. In some embodiments, time delay identifier 1014 performs steps 1202-1204 periodically to ensure that the time delay parameter $L_{parameter}$ is sufficiently close to a currently used time delay parameter $L_{parameter}$ of plant 1020. In some embodiments, if the time delay parameter $L_{parameter}$ as calculated by time delay identifier 1014 exceeds or is less than a currently used time delay parameter $L_{parameter}$ by a predetermined amount, time delay identifier 1014 adjusts the currently used time delay parameter $L_{parameter}$ to account for changes in the time delay L of plant 1020.

Process 1200 includes selecting the time delay parameter of the plant based on system information (step 1206), according to some embodiments. In some embodiments, step 1206 is performed by time delay identifier 1014. In some embodiments, the time delay parameter $L_{parameter}$ is selected by time delay identifier 1014 based on any of a type of building equipment 1022, a type of plant 1020, a type of HVAC system that building equipment 1022 are implemented in, various performance or operating parameters of building equipment 1022 (e.g., heating capacity, cooling capacity, etc.), or any other system information, performance characteristics, or system parameters of control system 600 and/or plant 1020. In some embodiments, time delay identifier 1014 selects the time delay parameter $L_{parameter}$ based on any of the system information from a database. Step 1206 can be performed in addition to or in place of steps 1202-1204.

Process 1200 includes receiving values of the performance variable y as feedback from the plant (step 1208), according to some embodiments. Process 1200 also includes predicting an impact of the time delay L of the plant on the performance variable y (step 1210), according to some embodiments. In some embodiments, step 1208 is performed by time delay identifier 1014 and/or filter 1010. The values of the performance variable y can be received as feedback during normal operation of building equipment 1022. In some embodiments, the time delay parameter $L_{parameter}$ is used to reduce or negate the impact of the time delay L of the plant. In some embodiments, the impact of the time delay L of the plant are determined directly or explicitly (e.g., by predicting future values of the performance variable y). In some embodiments, the impact of the time delay L of the plant are determined indirectly or implicitly by determining an amount that the performance variable y should be increased or decreased (e.g., by determining the filtered performance variable $y_f$) to account for, invert, mitigate, reduce, negate, etc., the impact of the time delay L of the plant.

Process 1200 includes artificially increasing or decreasing (e.g., adjusting) one or more values of the performance variable y to negate the impact of the time delay L on the performance variable y (step 1212), according to some embodiments. In some embodiments, step 1212 is performed by filter 1010. Step 1212 can be performed by using an exponential expansion of a transfer function or using an approximation of an exponential expansion of a transfer function (e.g., filter 1010) as described in greater detail above.

Process 1200 includes performing on-off control to determine a value of a manipulated variable u based on the artificially increased or decreased values of the performance variable y (step 1216), according to some embodiments. In some embodiments, step 1216 is performed by feedback controller 1012. In some embodiments, feedback controller 1012 uses the artificially increased or decreased values of the performance variable y (e.g., the filtered performance variable $y_f$) in on-off control to determine control decisions for building equipment 1022. Building equipment 1022 may be on-off equipment configured to transition between the on-state and the off-state. In some embodiments, building equipment 1022 is multi-stage equipment and feedback controller 1012 is configured to determine control decisions for various stages of building equipment 1022 based on the artificially increased or decreased values of the performance variable y (e.g., to determine when to transition various stages of building equipment 1022 between an on-state and an off-state). Feedback controller 1012 can generate values of the manipulated variable u for the entire building equipment 1022, or for individual or particular stages of building equipment 1022 to transition building equipment 1022 or the individual stages of building equipment 1022 between the on-state and the off-state.

Process 1200 includes generating control signals for equipment based on the value of the manipulated variable u (step 1216) and operating the equipment using the control signals to affect the performance variable y of the plant (step 1218), according to some embodiments. In some embodiments, steps 1216 and 1218 are the same as or similar to steps 1116 and 1118 of process 1100. Steps 1216 and 1218 can be performed by control signal generator 1016 to generate control signals for building equipment 1022 or to generate control signals for particular stages of building equipment 1022.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for HVAC equipment of a plant, the controller comprising a processing circuit configured to:
   predict an impact of a time delay of the plant on a performance variable received as feedback from the plant, wherein the time delay is an amount of time that elapses between:
      a first time at which the HVAC equipment performs a transition between an on state and an off-state; and
      a second time at which the performance variable begins to change as a result of the transition or changes by an amount exceeding a threshold as a result of the transition;
   artificially increase or decrease a value of the performance variable using an adjustable time delay parameter to at least partially negate the impact of the time delay on the performance variable; and
   use the artificially increased or decreased value of the performance variable in on-off feedback control to operate the HVAC equipment, wherein the on-off feedback control comprises transitioning the HVAC equipment or a stage of the HVAC equipment between the on-state and the off-state based on a setpoint value.

2. The controller of claim 1, wherein the on-off feedback control comprises deadband control and the controller is configured to transition the HVAC equipment or the stage of the HVAC equipment between the on-state and the off-state based on the setpoint value and a deadband value.

3. The controller of claim 1, wherein the controller is configured to artificially increase or decrease the value of the performance variable using a filter based on an exponential expansion of a transfer function that at least partially negates the impact of the time delay on the performance variable.

4. The controller of claim 3, wherein the controller is configured to artificially increase or decrease the value of the performance variable using a plurality of filters in series that at least partially negate the impact of the time delay of the plant on the performance variable.

5. The controller of claim 1, wherein the controller is configured to obtain the adjustable time delay parameter based on samples of the performance variable received over a time period.

6. The controller of claim 5, wherein the controller is configured to obtain the adjustable time delay parameter by perturbing an input to the plant and observing a dynamic response of the plant to the perturbed input.

7. The controller of claim 1, wherein the controller is configured to increase or decrease the adjustable time delay parameter in response to the time delay of the plant changing.

8. The controller of claim 1, wherein the controller is configured to obtain the adjustable time delay parameter based on at least one of a type of the HVAC equipment, one or more parameters of a space of the plant, or one or more parameters of the plant.

9. A method for performing on-off control for a plant, the method comprising:
predicting an impact of a time delay of the plant on a performance variable received as feedback from the plant, wherein the time delay is an amount of time that elapses between:
- a first time at which HVAC equipment performs a transition between an on-state and an off-state; and
- a second time at which the performance variable begins to change as a result of the transition or changes by an amount exceeding a threshold as a result of the transition;

artificially increasing or decreasing a value of the performance variable using an adjustable time delay parameter to at least partially negate the impact of the time delay on the performance variable; and using the artificially increased or decreased value of the performance variable in on-off feedback control to operate the HVAC equipment, wherein the on-off feedback control comprises transitioning the HVAC equipment or a stage of the HVAC equipment between the on-state and the off-state based on a setpoint value.

10. The method of claim 9, further comprising increasing or decreasing the adjustable time delay parameter in response to a change in the time delay of the plant.

11. The method of claim 9, wherein the performance variable is artificially increased or decreased using one or more filters and one or more samples of the performance variable, wherein each of the filters correspond to a portion of an exponential expansion of a transfer function that at least partially negates the impact of the time delay.

12. The method of claim 9, further comprising selecting the adjustable time delay parameter based on at least one of a type of the HVAC equipment, one or more parameters of a space of the plant, or one or more parameters of the plant.

13. The method of claim 9, further comprising:
perturbing an input to the plant;
observing a dynamic response of the plant to the perturbed input; and
obtaining the adjustable time delay parameter based on the dynamic response of the plant.

14. A system for controlling a plant, the system comprising:
HVAC equipment that operates to affect a performance variable of a plant; and
a controller comprising a processing circuit configured to:
predict an impact of a time delay of the plant on the performance variable received as feedback from the plant, wherein the time delay is an amount of time that elapses between:
- a first time at which the HVAC equipment performs a transition between an on-state and an off-state; and
- a second time at which the performance variable begins to change as a result of the transition or changes by an amount exceeding a threshold as a result of the transition;

artificially adjust a value of the performance variable using an adjustable time delay parameter to at least partially negate the impact of the time delay on the performance variable; and use the artificially adjusted value of the performance variable in on-off feedback control to operate the HVAC equipment, wherein the on-off feedback control comprises transitioning the HVAC equipment or a stage of the HVAC equipment between the on-state and the off-state based on a setpoint value.

15. The system of claim 14, wherein the controller is configured to increase or decrease the adjustable time delay parameter to account for a change in the time delay of the plant.

16. The system of claim 14, wherein the controller is configured to artificially increase or decrease the value of the performance variable using a filter based on an exponential expansion of a transfer function that at least partially negates the impact of the time delay on the performance variable.

* * * * *